Patented Feb. 16, 1926.

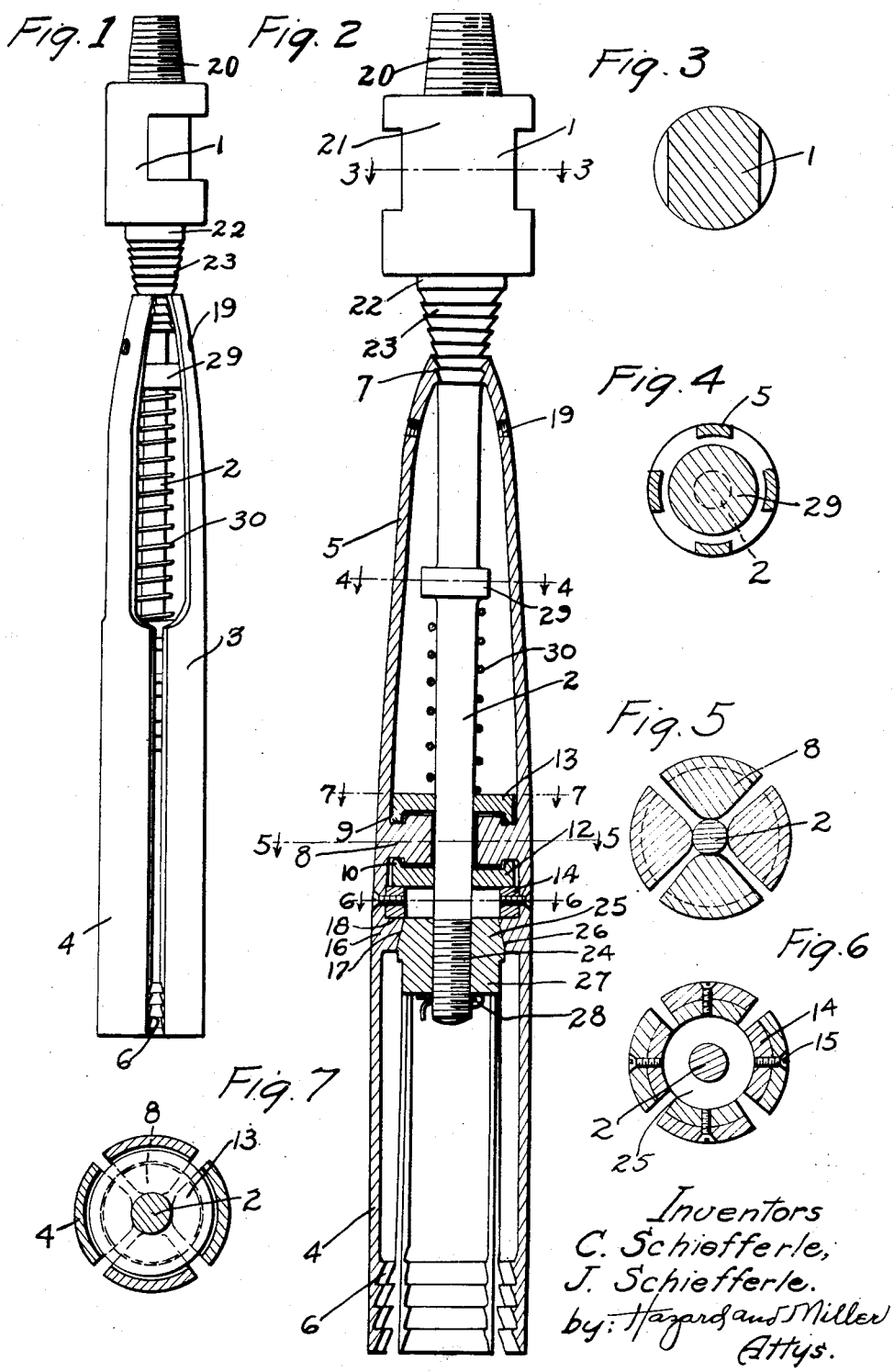

1,573,646

UNITED STATES PATENT OFFICE.

CHARLES SCHIEFFERLE, OF LOS ANGELES, AND JULIUS SCHIEFFERLE, OF INGLEWOOD, CALIFORNIA.

FISHING TOOL.

Application filed July 9, 1925. Serial No. 42,462.

*To all whom it may concern:*

Be it known that we, CHARLES SCHIEFFERLE and JULIUS SCHIEFFERLE, citizens of the United States, residing at Los Angeles, and at Inglewood, respectively, in the county of Los Angeles and State of California, have invented new and useful Improvements in Fishing Tools, of which the following is a specification.

Our invention is a fishing tool used in well boring to fish various articles and is particularly adapted for lifting underreamer lugs. Our fishing tool is of the jarring type adapted to grip an object by a jar, causing the gripping fingers to secure and firmly hold the object.

Our invention comprises a plurality of elongated separate strips pivotally supported at substantially their mid position on the inside, having gripping prongs at the lower end and teeth adapted to engage a ratchet on the jarring tool and to be clamped thereon with the fingers expanded and to automatically grip the ratchet when the jar is forced downwardly. The jarring tool is provided with an elongated stem extending downwardly inside the circle of gripping fingers and has a wedge-shaped nut which bears against wedging surfaces on the fingers and may be tightened before the tool is lowered into the well to clamp the gripping fingers at any particular diameter desired. The fingers themselves are retained in position by having internal lugs with upper and lower recesses therein, engaged by rings having flanges extending into the recesses, the recesses functioning as grooves.

Our invention will be more readily understood from the following description and drawings, in which;

Figure 1 is a perspective view of our fishing tool as being lowered into a well.

Fig. 2 is a vertical longitudinal section of the tool, intersecting two of the opposite fingers and showing the jarring rod in elevation.

Fig. 3 is a cross section on the line 3—3 of Fig. 2 in the direction of the arrows.

Fig. 4 is a cross section on the line 4—4 of Fig. 2 in the direction of the arrows, showing the shoulder on the jarring rod stem, showing in section the upper or clamping end of the fishing fingers.

Fig. 5 is a cross section on the line 5—5 of Fig. 2, showing the inwardly projecting lugs on the fishing fingers.

Fig. 6 is a cross section of Fig. 2 on the line 6—6 of Fig. 2 in the direction of the arrows, showing the retaining segments attached to the fishing fingers.

Fig. 7 is a cross section on the line 7—7 of Fig. 2 in the direction of the arrows, showing one of the retaining rings engaging the lugs of the fishing fingers.

In the drawings, a jarring rod is indicated generally by the numeral 1, having an extension stem 2 passing downwardly inside a series of fishing fingers 3. The jarring rod and its stem are arranged to have longitudinal movement downwardly between the circle of gripping fingers and function to hold the fingers in a position for lowering in a well and in their gripping position to lift an object.

The fishing fingers 3 are preferably made of a high grade metal having resilient qualities and have lower gripping ends 4 and upper clamping fingers 5. The lower end of the fingers are provided with gripping prongs 6 and the upper end with clamping teeth 7. The fingers are curved transversely, each forming an arc of a circle of the desired extent to properly grip an object. In the drawings four fingers are shown but the number may be changed to suit special requirements.

Each of the fingers is provided with an inwardly extending lug 8, each of which has an upper and a lower segmental recess 9 and 10 in which a pair of rings 11 and 12 having downwardly and upwardly extending flanges respectively, engage. The lower ring 12 is held in position by segments 14 secured to the wall of the fingers by screws 15 as shown particularly in Figs. 2 and 6.

The fingers are also provided with internal abutments 16 having bevelled faces 17. These are so positioned as to form a shoulder 18 against which the segments 14 make a tight fit. The fishing fingers are also provided at their upper end, each with a screw threaded apertures 19 for disengaging the article lifted as will be hereafter explained.

The jarring rod and its cooperative elements are substantially as follows:—The upper end of the rod is screw threaded as indicated at 20 to engage with the usual well tools utilized in fishing operations and has a heavy section 21 forming both a wrench grip and a heavy weight to function in the jarring operation. The stem 2 is of considerably less diameter than the weight 21 forming a tapered section 22 on which are a series of ratchet teeth 23 of annular formation. These teeth are successively of less diameter and are shaped to grip with the clamping teeth 7 of the fishing fingers.

The lower end of the stem 2 is screw threaded as indicated at 24, having an abutment nut 25 with upwardly inclined bevel faces 26 to co-act with the bevel faces 17 of the abutments 16 of the fingers. The nut has a wrench grip 27 at its lower end of any suitable type and for safety's sake is retained in position by a cotter pin 28 through a cross aperture in the end of the stem. A shoulder 29 is formed integral with the stem below the tapered section and a strong compression spring 30 coils around the stem, bears against the lower surface of the shoulder and the upper surface of the upper ring 11.

The operation of rigging the fishing tool for insertion in a well is substantially as follows:—The upper ends of the fingers would be spread apart until the lower ends are spaced the proper diameter to enter the well casing or other pipe in which the fishing operation takes place. The teeth 7 are brought into engagement with the ratchet teeth 23 on the jarring rod and the abutment nut 25 is screwed upwardly until it bears firmly against the abutments 16 on each of the fingers. Thus the fingers are firmly clamped in position between the ratchet teeth and the abutment nut, the rings 11 and 12 being held in close and tight engagement with the recesses 9 and 10 in the lugs 8. In this position the fishing tool is very rigid.

The operation of engaging and fishing an object is substantially as follows:—When the lower ends of the fingers strike the bottom of the well, any object therein is forced upwardly between the fingers and on the jar given by the jarring rod the stem is forced downwardly, forcing the abutment nut out of engagment with the internal abutments 16 and causing the teeth 7 to ride up on the annular ratchet teeth of a greater diameter than they formerly engaged by riding up on the tapered section 22. On account of the resilient nature of the fingers, the object is gripped tightly at the lower end and the ratchet on the jarring rod engages the teeth 7 at the upper end sufficiently tight to retain the object. In this action the fingers rock on the lugs 8 which as the spring 30 becomes more compressed is more firmly gripped between the rings 11 and 12.

After the object has been raised to the surface, bolts are threaded through the apertures 19 at the upper ends of the fingers and forcibly threaded inwardly with their ends bearing on the stem until the upper ends of the fingers are sprung out of engagement with the ratchets 23, thus allowing the jarring rod to be raised, the upper ends of the fingers to rock inwardly and thus drop the object from the lower ends of the fingers.

Our invention may be considerably modified without departing from the spirit thereof to suit special requirements and for different types of fishing. The manner of retaining the fingers in proper circular relation and of swinging these to grip an object may also be considerably modified in conformity with our invention.

Having described our invention, what we claim is:

1. A fishing tool comprising in combination a plurality of longitudinal fingers, a jarring rod, means slidable on the jarring rod and situated between the upper and lower ends of each finger to retain them in relative position around a circle, means rigidly secured to the jarring rod to positively clamp the fingers with the lower ends expanded and the upper ends contracted, and means on the jaring rod to force the upper ends outwardly and to retract the lower ends of the fingers to grip an object.

2. A fishing tool as claimed in claim 1, in which the jarring rod is formed with a tapered upper section with fixed ratchet teeth formed thereon, the said teeth forcing the upper ends of the fingers outwardly on the downward movement of the jarring rod relative to the fingers.

3. A fishing tool comprising in combination a plurality of fishing fingers arranged in a circle and extending longitudinally substantially parallel, means to retain the fingers in a position around the circle, said means engaging the fingers on the inside between the upper and lower ends, a jarring rod having a stem extending downwardly between the fingers, means rigidly secured on said jarring rod to hold the fingers in a positively clamped position for lowering with the lower ends expanded and the upper ends contracted and means operated by the jarring tool to directly force the upper ends outwardly and the lower ends inwardly to grip an object.

4. A fishing tool as claimed in claim 3, having in addition a tapered surface on the jarring rod having fixed ratchet teeth adapted to engage directly with teeth on the upper ends of the fingers.

5. A fishing tool as claimed in claim 3, having in addition a wedge-shaped surface having fixed ratchet teeth on the upper end of the jarring rod adapted to engage the upper ends of the fingers directly and an adjustable abutment nut engaging the fingers below their retaining point.

6. A fishing tool, comprising in combination a plurality of elongated fishing fingers, inwardly extending lugs at substantially their mid length, a jarring rod having a tapered upper section adapted to engage the upper ends of the fingers, a stem extending downwardly from the jarring rod between the fingers, an inwardly extending abutment on the fingers below the lugs, an adjustable abutment nut on the end of the stem adapted to engage the abutments on the fingers, and means to engage the lugs on the fingers and retain them in adjusted position around a circle.

7. A fishing tool as claimed in claim 6, having a plurality of ratchet teeth formed on the tapered part of the jarring rod adapted to engage teeth on the upper ends of the fingers.

8. A fishing tool as claimed in claim 6, having upper and lower rings engaging recesses formed in the lugs, means secured to the fingers to retain the lower ring in position and a compression spring encircling the stem and retained in position thereby bearing against the upper ring.

9. A fishing tool, comprising in combination a plurality of elongated fishing fingers substantially parallel each having an inwardly extending lug at substantially its mid length with an upper and lower curved recess on the lug, an upper and lower ring having flanges engaged in said recesses, inwardly extending abutments on the fingers below the lugs having inclined surfaces, a jarring rod having a tapered upper section and a stem extending downwardly therefrom, screw threads on the end of the stem, an abutment nut threaded thereon having a surface adapted to co-act with the abutments on the fingers, means on the tapered section to engage the upper ends of the fingers and means to retain the rings firmly clamped to the lugs.

10. A fishing tool as claimed in claim 9, in which the means to retain the rings comprises a plurality of segments secured to each finger below the lower ring, a shoulder on the stem above the upper ring and a compression spring coiled on the stem between the upper ring and the shoulder.

11. A fishing tool as claimed in claim 9, having a plurality of annular teeth on the tapered section of the jarring rod engaging with teeth on the upper ends of the fingers.

12. A fishing tool as claimed in claim 9, having screw threaded apertures through the fingers near the upper ends adapted to allow insertion of bolts to separate the ends from the tapered section of the jarring rod.

In testimony whereof we have signed our names to this specification.

CHARLES SCHIEFFERLE.
JULIUS SCHIEFFERLE.